Oct. 13, 1925.
C. B. THWING
1,557,387
ELECTRIC TEMPERATURE CONTROL
Filed Feb. 23, 1923   2 Sheets-Sheet 2
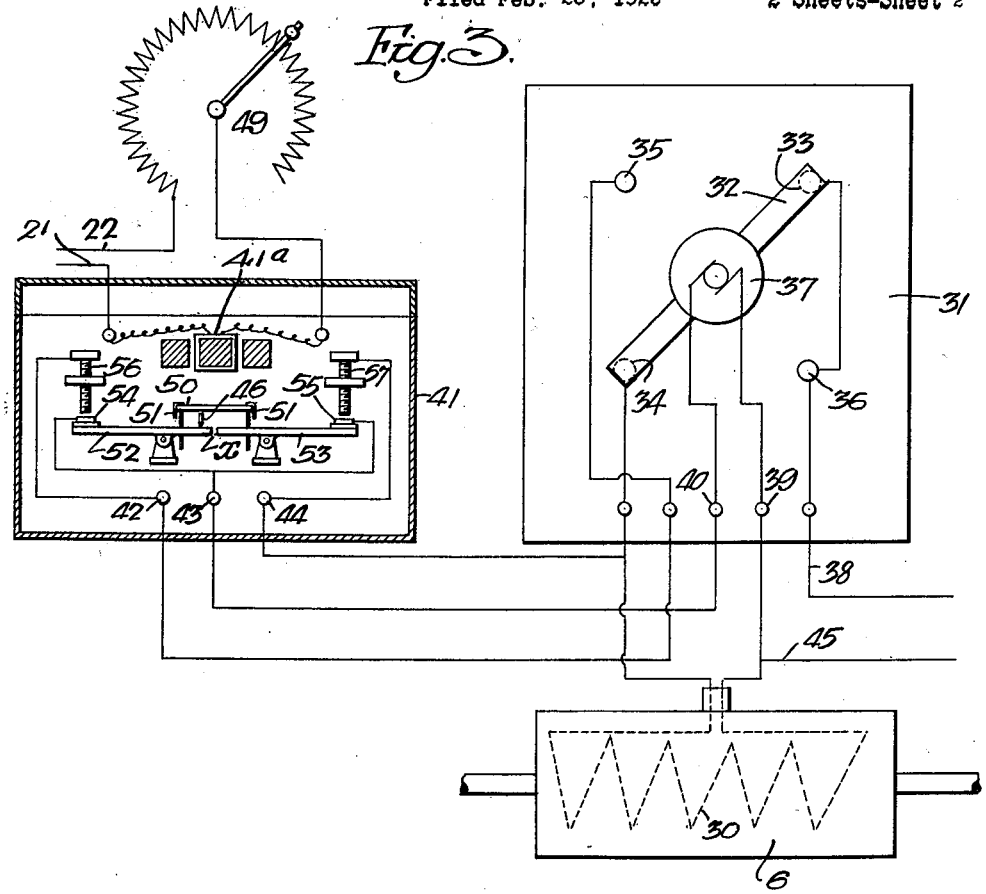
Fig.3.
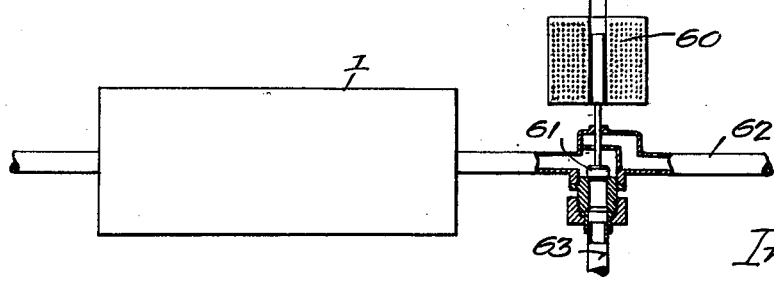
Fig.4.
Inventor—
Charles B. Thwing.
by his Attorneys—
Howson & Howson Patented Oct. 13, 1925.

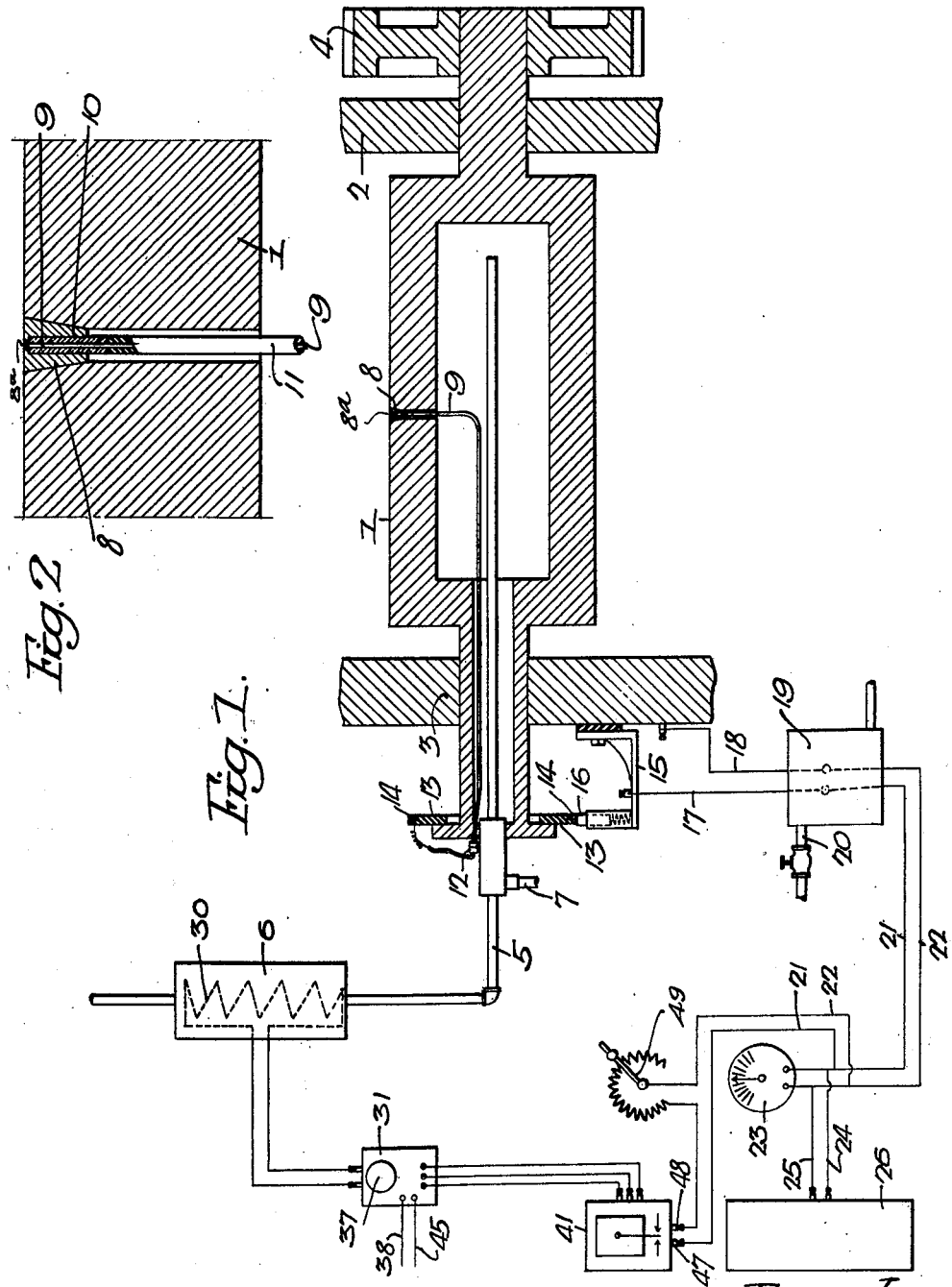

1,557,387

UNITED STATES PATENT OFFICE.

CHARLES B. THWING, OF PHILADELPHIA, PENNSYLVANIA, ASSIGNOR TO THWING INSTRUMENT COMPANY, OF PHILADELPHIA, PENNSYLVANIA, A CORPORATION OF PENNSYLVANIA.

ELECTRIC TEMPERATURE CONTROL.

Application filed February 23, 1923. Serial No. 620,857.

*To all whom it may concern:*

Be it known that I, CHARLES B. THWING, a citizen of the United States, residing in Philadelphia, Pennsylvania, have invented Electric Temperature Controls, of which the following is a specification.

One object of my invention is to provide a simple, reliable and accurate system of apparatus for use in controlling, either manually or automatically, the temperature of metal rolls such as are used in calendering—, ironing—, rubber working— and other machines including rolls which are heated or cooled under operating conditions.

Another object of my invention is to provide novel means for indicating the temperature at the surface of a roll under conditions of use, and the invention further contemplates a relatively simple device whereby the supply of a heating medium such as water, steam or electric current shall be automatically regulated in accordance with temperature changes at the working surface of the roll.

I also desire to provide a novel galvanometer-controlled switch particularly designed to govern one or more electric circuits except when the needle or other moving element of the galvanometer occupies a predetermined and definite position, and the invention also includes novel means for conveniently adjusting the deflection at which the galvanometer causes operation of the switch.

Another object of my invention is to provide a novel combination of apparatus for automatically governing the supply of heating medium to a roll to be heated, in accordance with variations in the temperature of the working surface of such roll,—the invention including a novel form of thermoelectric couple including the roll itself as one of its elements, whereby it is possible to accurately indicate, record or automatically control the temperature of the working surface of said roll.

These objects and other advantageous ends I attain as hereinafter set forth, reference being had to the accompanying drawings, in which, Fig. 1 is a diagram illustrating the preferred arrangement of apparatus constituting my invention;

Fig. 2 is an enlarged fragmentary vertical section illustrating the hot junction of the thermo couple forming part of my invention;

Fig. 3 is a diagram illustrating the electrical connections of certain of the apparatus used in connection with my invention; and, Fig. 4 is a diagram illustrating a modification of the invention.

In the above drawings, 1 represents a hollow roll mounted in bearings 2 and 3 and driven from a suitable source of power through gear or pulley 4. In the case illustrated, the roll is designed to be heated by water supplied through a pipe 5 from an electric water heater 6 and extending into one end of the roll through a suitable stuffing box or equivalent device (not shown). The water flows out of the roll through a waste pipe 7. In accordance with my invention, at a suitable point in the cylindrical or working surface of the roll preferably adjacent its central plane, I form an inwardly tapering hole in which I mount a steel or other suitable metallic plug 8. This is centrally perforated for the reception of a conductor 9 one end of which is welded at $8^a$ to said plug at the outer surface thereof so as to be flush with the cylindrical surface of the roll in which it is mounted. The roll itself is of steel or cast iron and constitutes one of the elements of a thermo couple while the conductor 9, which is made of constantan or some other nickel alloy, constitutes the second element of the couple.

Within the plug 8, the conductor 9 is suitably insulated to within a short distance of its welded extremity by a porcelain or other refractory tube 10 and from this tube within the roll 1 it is provided with a suitable flexible insulating covering 11, being extended through one neck of the roll to a suitable terminal 12 on the outside of one end of the latter. Adjacent this end of the roll, I mount on it an insulating structure 13 carrying a metallic contact ring 14 and on the bearing 3, I mount an arm 15 carrying a brush 16 electrically engaging said latter ring. From this brush and from the bearing 3 or other suitable portion of the frame in which the roll 1 is mounted, I run a pair of compensating leads 17 and 18 to a box or container 19 kept by any suitable means at a constant temperature. For example, said box may be supplied through a pipe 20 with steam at atmospheric pressure so that the terminals of the wires or leads 17 and 18 within it are likewise maintained at all times at the same temperature.

From the terminals of said leads within the box 19 I run two conductors 21 and 22 to a suitable indicating galvanometer 23 and may also extend branch conductors 24 and 25 to a recording galvanometer or equivalent device 26. These instruments 23 and 26 are properly calibrated in degrees so that they respectively indicate and record the temperature at the hot junction of the thermo-couple comprised by the roll 1 and conductor 9. Moreover it is noted that temperatures shown are those of the external or working surface of said roll 1, so that by the means described it is possible to obtain accurate readings or indications of that portion of the roll engaging whatever material is operated on.

If it be desired to automatically regulate the supply of heating medium to the roll, I may provide such an arrangement of apparatus as that shown in the drawings and more especially as illustrated in Fig. 3. For the purpose noted, the coil or heating element 30 of the electric heater 6 is connected to a suitable form of motor-actuated switch 31 which includes an oscillatory or pivotally mounted blade 32 capable of simultaneously engaging either of two pairs of fixed contacts 33—34 or 35—36. This blade is designed to be actuated by an electric motor 37 through suitable quick break mechanism which after said motor has been started, causes the blade to instantaneously move from engagement with one pair of contacts into engagement with the other pair whereon it remains until the motor is again operated. The contacts 36 and 33 of the switch are both connected to a current supply line 38 and a second current supply main 45 is connected to one terminal of the heating element 30 as well as to a terminal 39 connected to one of the terminals of the motor 37. The second terminal of said motor is connected to a terminal 40.

In addition to the motor-controlled switch 31, I provide a controlling galvanometer 41 for governing a pair of switches having three terminals 42, 43, and 44 of which the first is connected to the terminal 35 of the switch 31. The terminal 43 is connected to the terminal 40 and the terminal 44 is connected to the motor terminal 34. The second current supply lead 45 is connected to the motor terminal 39 and to one terminal of the heating coil 30.

The galvanometer 41 may be of any suitable construction capable of being actuated by the current produced by the thermo couple comprised by the elements 1 and 9 and includes a movable element in the form of a swinging or pivotally mounted needle 46. The winding 41ª of the galvanometer is connected in circuit with two terminals 47 and 48 to which are connected the leads 21 and 22 and in one of these leads I preferably connect a control rheostat 49 whereby the current flow from the thermo couple may be adjusted to produce any desired deflection of the needle 46.

Mounted to cooperate with the needle 46 is a depressor 50 in the shape of a substantially horizontal element mounted over said needle adjacent the free end thereof and having at its extremity downwardly projecting stops 51—51 which limit the possible swing of said needle. This depressor, by suitable mechanism (not shown) but well known to the art, is designed to periodically engage and move downwardly the needle 46. Under the needle and in such position as to be engaged thereby when it is depressed I mount two levers 52 and 53 in the form of two aligned bars so amounted as to extend in substantially the same horizontal line, with their short arms immediately adjacent each other but spaced apart. At the end of the long arm of the lever 52 is mounted an insulated contact 54 and a similar contact 55 is mounted on the end of the long arm of the lever 53 while adjacent and immediately above these two contacts are mounted two fixed contacts 56 and 57, the arrangement being such that if, when the depressor 50 is lowered, the needle 46 lies over the short arm of one of the levers, that lever will be turned on its fulcrum and the contact on its long arm will be moved into electrical engagement with the corresponding fixed contact. The space between the adjacent ends of the levers 52 and 53 is of such width that if the needle 46 is immediately over it when the depressor is lowered, neither lever will be actuated, this position of the needle being that corresponding to the selected temperature at which it is desired the surface of the roll shall be maintained. The two fixed contacts 56 and 57 are respectively connected to the terminals 42 and 44, while the two movable contacts 54 and 55 are both connected to the middle terminal 43.

With the above described arrangement of parts, if current from a suitable source is supplied to the conductors 38 and 45, with the motor switch blade 32 in the position illustrated, and if cold water be supplied to the electric heater 6 and delivered therefrom through the pipe 5 to the roll 1, current will flow from the line 38 through the blade 32 to the heating coil 30 and thence to the line 45 so that said water will be heated. The temperature of the surface of the roll is thus gradually raised and if the actuating mechanism of the depressor 50 be set in operation, said depressor will periodically move down and as long as the needle 46 of the galvanometer lies over the short arm of the lever 52, the contact 54 of this lever will be moved into engagement with the fixed contact 56 at each operation of said depressor. This, however, causes no operation of any of the apparatus since this particular pair of contacts is open circuited.

As the temperature of the roll 1 approaches the predetermined desired point, the galvanometer needle 46 moves toward the right, and when said temperature reaches said point, said needle, by proper adjustment of the rheostat 49 is caused to occupy a position immediately over the space $x$ between the adjacent ends of the levers 52 and 53. As a consequence when the depressor 50 acts, neither of these levers is moved. Inasmuch, however, as current is still supplied to the coil 30, the temperature of the water in the heater 6 continues to rise, so that the roll temperature is also increased. The current produced by the thermo couple formed by the roll 1 and element 9 is consequently increased in amount, so that the galvanometer needle 46 swings further toward the right, with the result that subsequent action of the depressor 50 causes the lever 53 to be turned on its fulcrum, thus bringing its contact 55 into engagement with the contact 57. Current is now free to flow from line 38 through the switch blade 32 to the contact 44 thence through the contacts 57 and 55 to the contact 43, to the contact 40 through motor 37 to contact 39 and to the line 45. Said motor is thereupon put into operation and moves the switch blade 32 from the position shown in the drawings into engagement with the contacts 35 and 36. This cuts off current from the coil 30 of the heater 6, so that there is no further rise in temperature of the water delivered to the roll 1 which is now cooled by said water. The switch blade 32 is, however, thus set so that while no action occurs as long as the galvanometer needle 46 is moved by the depressor into engagement with the lever 53, or is moved into the space between the levers, as soon as the temperature of the roll has fallen to such a point that said needle swings over the short end of the lever 52, the next subsequent action of the depressor will cause the contact 54 to be moved into engagement with the contact 56. Thereupon current will flow from the line 38 through the blade 32, to contact 42, thence through contacts 56 and 54 to terminal 43 thence to contact 40 through motor 37 to terminal 39 and to line 45 starting motor 37 and causing it to move switch blade 32 into the position shown in the drawings in engagement with the contacts 33 and 34. Current is now free to flow from the line 38 through the blade 32 to the heating coil 30 and the line 45, and while no further action of the motor 37 occurs by reason of the action of the depressor 50 as long as the needle 46 lies over the lever 52 or over the space between the levers, an increase in the temperature of the roll with a corresponding increase of the thermo electric current delivered to the galvanometer 41 will cause the needle to again move over the lever 53, whereupon the above described cycle of operations is repeated.

At any time the temperature of the working surface of the roll may be noted from the indicating galvanometer 23 and a record of the temperature variations of said working surface continuously made by the instrument 26.

By the apparatus described the supply of heating medium to the roll is automatically governed, so that the roll temperature is maintained between relatively narrow limits which may be accurately adjusted by the rheostat 49. Obviously if the amount of resistance in the galvanometer circuit is increased, a higher temperature of the roll will be required to generate sufficient current to deflect the needle 46 into such a position that it may be depressed into engagement with the lever 53 which controls the cutting off of the current to the heater 6.

As shown in Fig. 4, I may in place of the electric heater 6 employ an electromagnet 60 to operate a valve 61 which in one position permits steam to flow from a pipe 62 to the roll 1 and in another position into which it moves under the action of gravity cuts off the supply of steam and permits cold water from a pipe 63 to be delivered to the roll. This electromagnet 60 will be connected with the apparatus shown in Fig. 3 in place of the coil 30 so that when it is energized, it will open the valve to allow steam to flow to the roll and when it is deenergized it will fall under the action of gravity to cut off the steam and permit the flow of cold water. If desired, the cold water connection to the above valve may be omitted without departing from my invention where positive cooling of the roll is not required.

While I have described the conductor 9 as welded to the plug 8 it is to be noted that without departing from my invention it may be brazed, soldered or otherwise suitably connected to said plug as shown at 8ᵃ in or immediately adjacent that surface thereof which constitutes a portion of the working or material-engaging surface of the roll.

I claim:
1. The combination with a roll of an element mounted adjacent to the working surface thereof and forming with said roll a thermo electric couple, said element having different thermo-electric properties from the roll.

2. The combination with a roll; of a body of metal having a different position in the thermo-electric series than said roll, said body of metal being electrically connected to said roll at its cylindrical surface and constituting with said roll a thermo electric couple.

3. The combination of a metallic roll and a metallic element in said roll electrically connected to its surface to constitute therewith a thermo electric couple, said element having a different position in the thermo-electric series than said roll.

4. The combination of a roll; and a body of metal different from that of said roll welded to the cylindrical surface thereof and constituting therewith a thermo couple.

5. The combination of a roll having a recess in its working surface; a metallic plug in said recess; with a metallic element welded to the plug and extended through the body of the roll to constitute therewith a thermo couple, said plug and said element being of dissimilar metals.

6. The combination with a heated metallic roll; of an element electrically connected with the roll to constitute therewith a thermo electric couple; and current actuated means connected in circuit with said thermo couple, said roll and said element being of dissimilar metals.

CHARLES B. THWING.